(12) United States Patent
Jakobsson

(10) Patent No.: US 9,411,955 B2
(45) Date of Patent: Aug. 9, 2016

(54) SERVER-SIDE MALWARE DETECTION AND CLASSIFICATION

(71) Applicant: FATSKUNK, INC., Mountain View, CA (US)

(72) Inventor: Bjorn Markus Jakobsson, Portola Valley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 13/964,001

(22) Filed: Aug. 9, 2013

(65) Prior Publication Data

US 2014/0047544 A1     Feb. 13, 2014

Related U.S. Application Data

(60) Provisional application No. 61/681,561, filed on Aug. 9, 2012.

(51) Int. Cl.
*H04L 29/06* (2006.01)
*G06F 21/55* (2013.01)
*G06F 21/56* (2013.01)

(52) U.S. Cl.
CPC .............. *G06F 21/55* (2013.01); *G06F 21/566* (2013.01); *H04L 63/14* (2013.01)

(58) Field of Classification Search
CPC ........................................................ H04L 63/14
USPC .............................................................. 726/23
See application file for complete search history.

(56) References Cited

U.S. PATENT DOCUMENTS

| | | | |
|---|---|---|---|
| 7,278,160 B2 * | 10/2007 | Black et al. ...................... | 726/23 |
| 7,337,470 B2 * | 2/2008 | Katz ................... | H04L 63/1458 |
| | | | 380/262 |
| 7,509,677 B2 * | 3/2009 | Saurabh et al. .................. | 726/23 |
| 2006/0085850 A1 * | 4/2006 | Mayfield ................ | G06F 21/335 |
| | | | 726/14 |

* cited by examiner

*Primary Examiner* — Longbit Chai
(74) *Attorney, Agent, or Firm* — Loza & Loza, LLP

(57) ABSTRACT

A server-side system that detects and classifies malware and other types of undesirable processes and events operating on network connected devices through the analysis of information collected from said network connected devices. The system receives information over a network connection and collects information that is identified as being anomalous. The collected information is analyzed by system process that can group data based on optimally suited cluster analysis methods. Upon clustering the information, the system can correlate an anomalous event to device status, interaction, and various elements that constitute environmental data in order to identify a pattern of behavior associated with a known or unknown strain of malware. The system further interprets the clustered information to extrapolate propagation characteristics of the strain of malware and determine a potential response action.

41 Claims, 7 Drawing Sheets

SERVER-SIDE MALWARE DETECTION AND CLASSIFICATION

The current application claims a priority to the U.S. Provisional Patent application Ser. No. 61/681,561 filed on Aug. 9, 2012.

FIELD OF THE INVENTION

The present invention relates generally to a server-side system for detecting malware on a plurality of networked units.

BACKGROUND OF THE INVENTION

Existing techniques for detecting the presence of unauthorized programs are typically resource-intensive. For example, they generally require constant updates (e.g., of blacklists) and periodic or continuous scans for problems. The situation is exacerbated if the device being protected by such techniques has limited resources, such as limited memory, or by being powered by a battery. As one example, a device with limited resources may not be able to store definitions for detecting all known unauthorized programs. As another example, scanning for unauthorized programs is typically a power-intensive act, and may quickly deplete the battery of a battery-powered device. In some environments, a central authority is used to facilitate the discovery of unauthorized programs. One drawback of this approach is that it typically requires that the device being protected compile detailed logs of device activities. Generating such logs is resource-intensive (e.g., requiring large amounts of disk storage; processing power to assemble the log data; and the bandwidth to deliver the log data to the central authority) and can also present privacy problems.

Existing techniques for detecting the presence of unauthorized programs are also generally vulnerable to attempts by such programs to cause incorrect reporting. For example, a rootkit can "listen in" to requests by applications to the operating system, and may modify these requests and their responses. If an application requests information about what processes are running, a malicious rootkit application can avoid detection by removing information about itself from the report that is returned by the operating system.

Existing techniques for screening against the installation or execution of unauthorized programs are also known to be vulnerable to new instances of malware that may not immediately be detectable due to a lack of information about their structure and functionality. Therefore, and irrespective of the resources available to the device, if the unauthorized program is sufficiently sophisticated and/or has not previously been encountered, it can evade detection and cause undetected harm. And, if the unauthorized program has intentionally been installed by the user to bypass detection (e.g., to facilitate software piracy), traditional techniques may fail to locate the unauthorized program, or any other unauthorized activities.

The generation of knowledge about the structure and functionality of malware, and the associated generation of countermeasures, is traditionally a labor-intensive effort, and there is a long-felt need to increase the degree of automation of this process, e.g., by automatic determination of what machines exhibit anomalous behavior, and the apparent requirement associated with malware causing such anomalous behavior.

The ability of traditional tools to project the spread patterns of malware is limited and not automated. That is a great drawback, since an ability to automatically generate trend prognoses for malware spreads permits more effective distribution of countermeasures, given a limitation of resources such as the generation of malware antidotes and the communication of these to a large number of networked devices whose need for the antidotes may differ greatly.

It is therefore the object of the invention to provide a server-side system that detects and classifies malware and other types of undesirable processes and events operating on network connected devices through the analysis of information collected from said network connected devices. The system receives information over a network connection and collects information that is identified as being anomalous. The collected information is analyzed by system process that can group data based on optimally suited cluster analysis methods. Upon clustering the information, the system can correlate an anomalous event to device status, interaction, and various elements that constitute environmental data in order to identify a pattern of behavior associated with a known or unknown strain of malware. The system further interprets the clustered information to extrapolate propagation characteristics of the strain of malware and determine a potential response action.

BRIEF DESCRIPTIONS OF THE DRAWINGS

DETAIL DESCRIPTIONS OF THE INVENTION

All illustrations of the drawings are for the purpose of describing selected versions of the present invention and are not intended to limit the scope of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
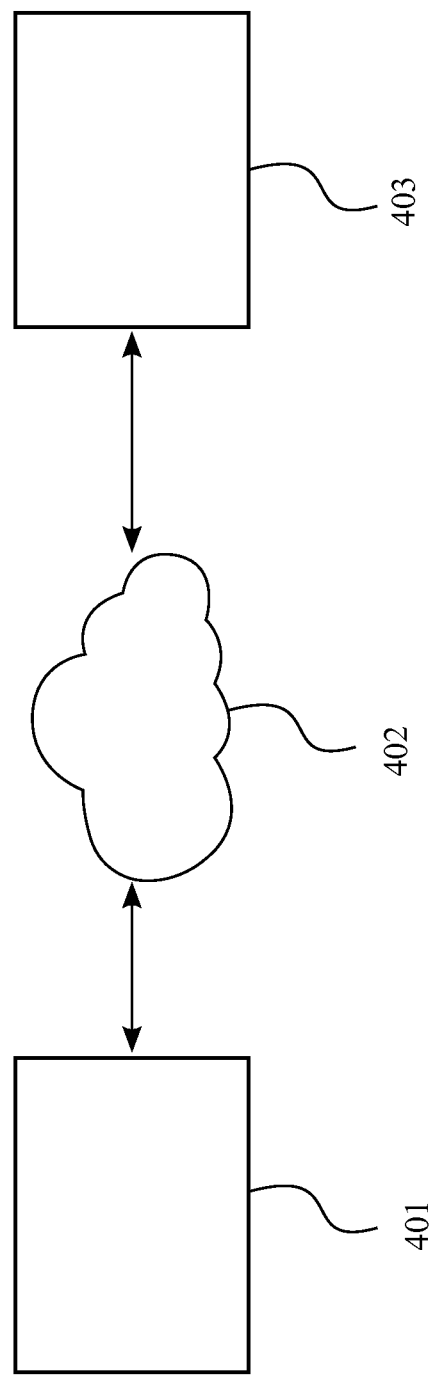
FIG. 1 illustrates an embodiment of an environment in which device auditing is provided.

FIG. 1 shows a diagram of an example use environment, including a networked unit 401, a communication network 402, and a detection and classification unit 403.

Figure 2:
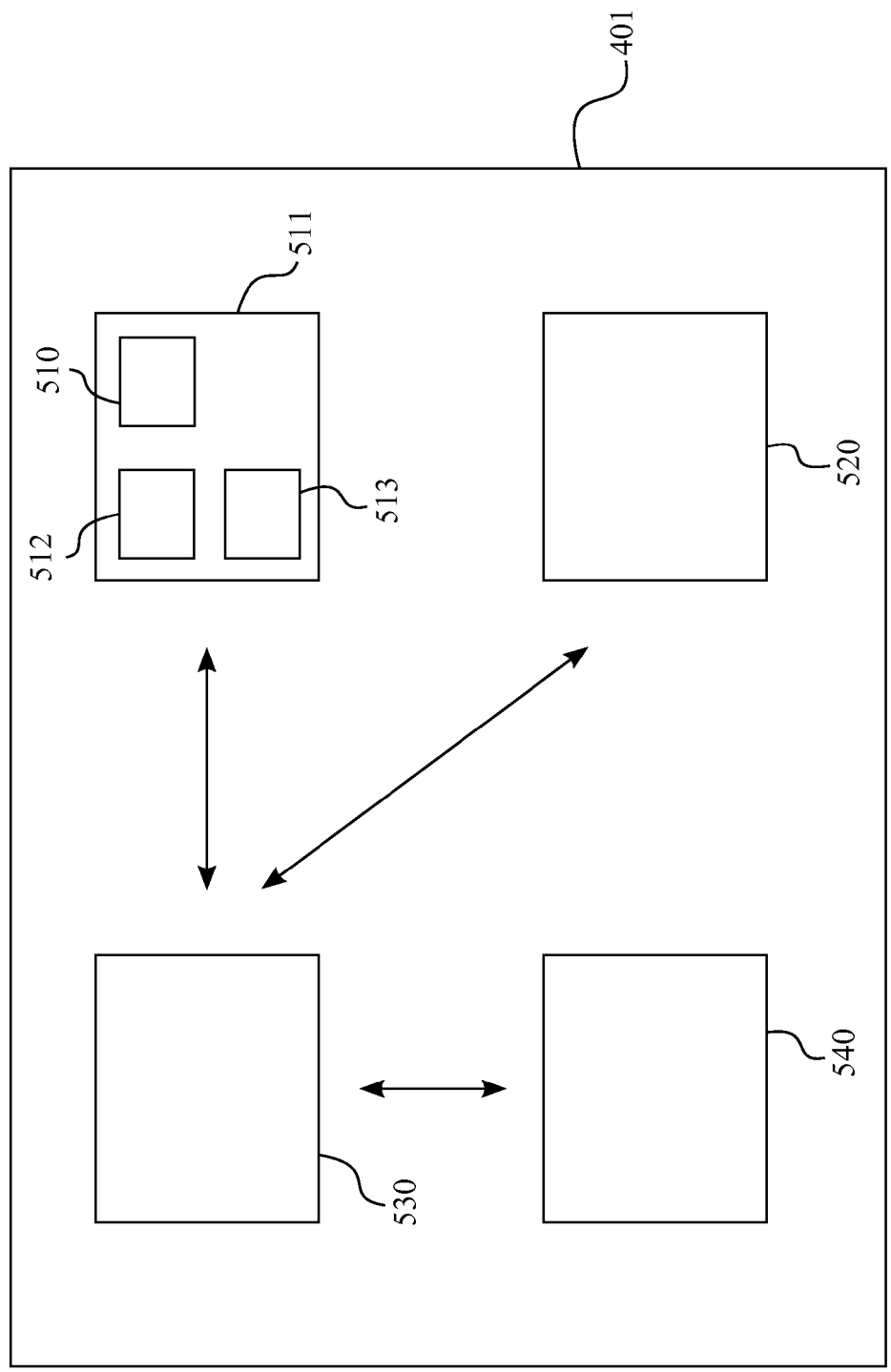
FIG. 2 illustrates an embodiment of the networked unit and some of its functional/logical components.
Figure 7:
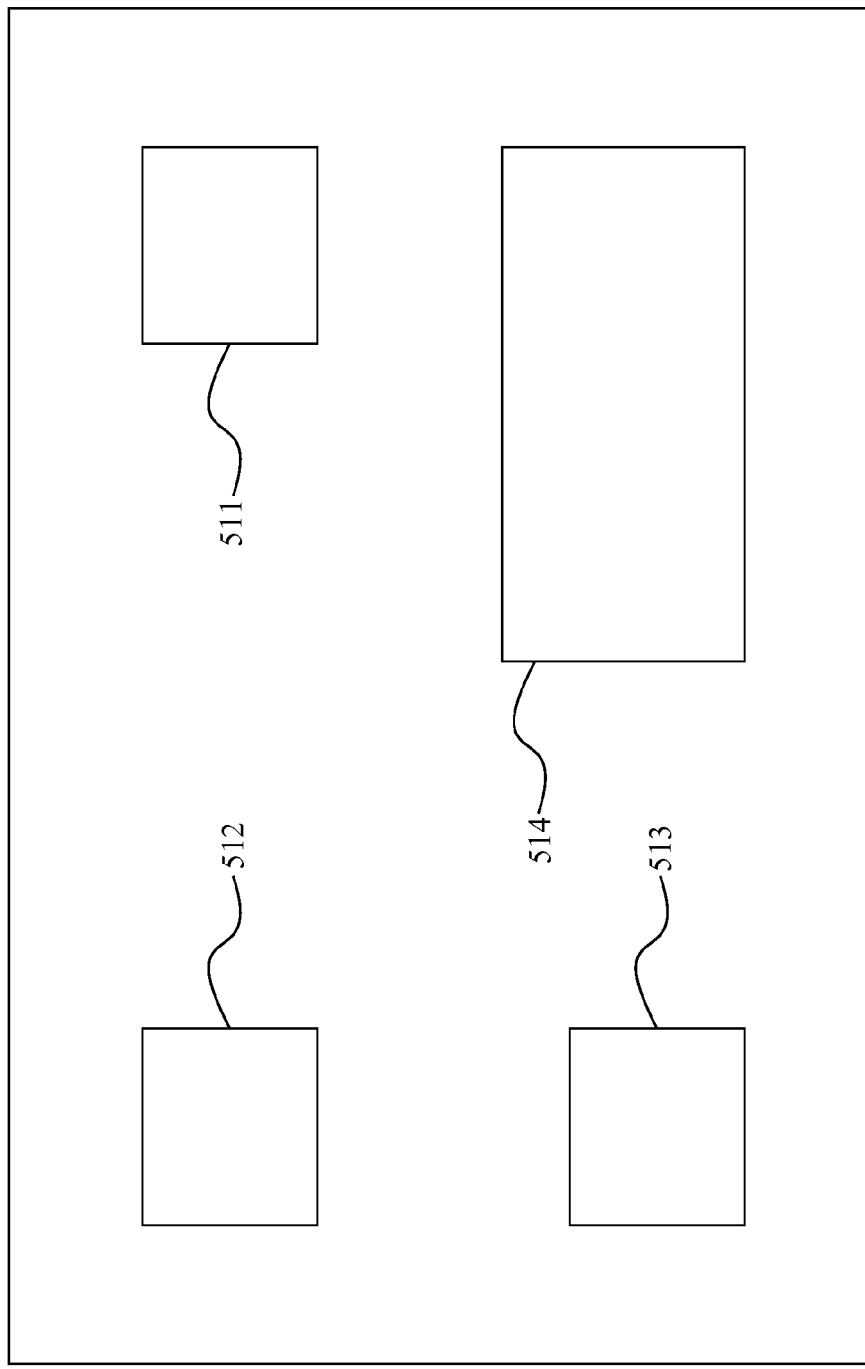
FIG. 7 illustrates an embodiment of the networked unit and some of its functional/logical components.

FIG. 2 shows networked unit 401 and some of its functional/logical components, including RAM 510, secondary storage 520, one or more processing units 530, and a communications unit 540, such as a radio or network interface. RAM 510 includes a routine 511 that is configured to interact with the detection and classification unit 403, one or more acceptable software components and their associated data 512, and (potentially) one or more malware components and their associated data 513. In some embodiments, the routine 511 disables the acceptable components/data 512 and attempts to disable the potentially present malware components 513, after which it uses a memory space 514 (of FIG. 7) to create a checksum value. This checksum value is transmitted to the detection and classification unit 403, along with other associated data.

Figure 3:
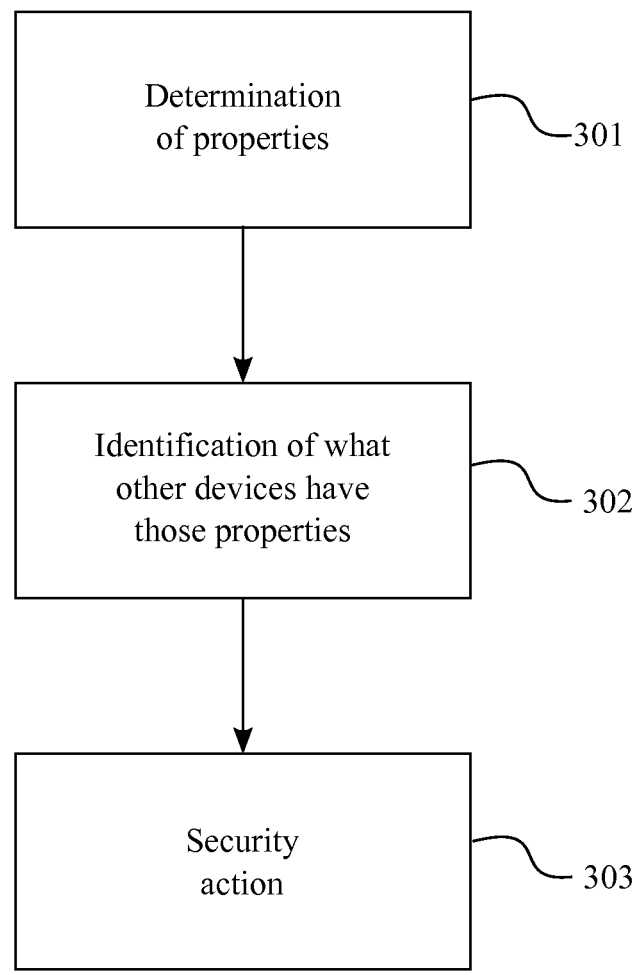
FIG. 3 illustrates an embodiment of the initiation of the security action.

FIG. 3 shows a process that involves determining the properties 301 of an identified malware instance; the identification 302 of other networked units that are likely to be at risk by having the same properties; and a security action 303 taken. Here, security action 303 can be specific to each networked unit identified in 302, and depend on the degree to which each such networked unit matches the properties determined in 301. The action can also be the same for many networked units with the same or different properties identified in 302. Example actions 303 are network isolation until the networked units have been verified to be secure; malware scan of identified networked units; and limited transaction capabilities until a security task has been completed for the identified networked units.

Figure 4:
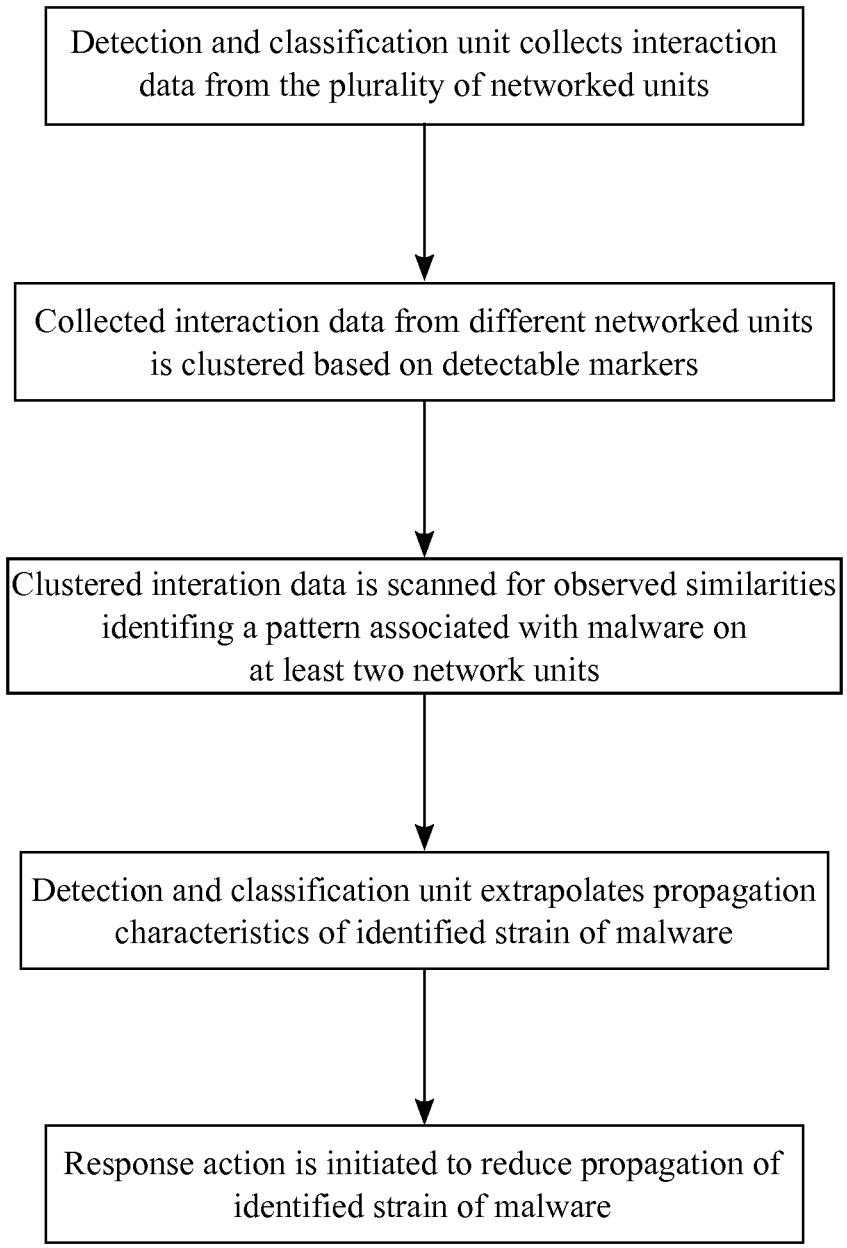
FIG. 4 illustrates an embodiment of the process of identifying a strain of malware on a networked unit.

Referencing FIG. 4, The disclosed invention is a server-side system that is utilized to identify and classify potential strains of malware and other types of undesirable processes and events operating amongst a plurality of networked units. For simplicity, we refer to all such types of undesirable processes as "malware" onwards. Thus, the term malware encompasses traditional viruses, worms, Trojans and related types of malicious software such as jailbreaks and anti-DRM software, as well as benevolent but undesirable software, including misconfigured software and software with vulnerabilities that cause it to misbehave. The system accomplishes this identification through the use of at least one detection and classification unit that is configured to collect interaction data from the plurality of networked units. The at least one detection and classification unit clusters interaction data from different networked units based on detectable markers. The at least one detection and classification unit identifies patterns associated with malware operating on at least two networked units based on observed similarities between clustered interaction data belonging to said networked units. Upon identification, the at least one detection and classification unit can then extrapolate infection, operation and propagation characteristics of the identified strain of malware, as well as initiate a response action to reduce propagation of said identified strain of malware. Moreover, it can identify infection and propagation behaviors and trends to determine the risk for other networked units to be affected, and identify what hardware and software products have vulnerabilities that are associated with the malware.

The at least one detection and classification unit is provided as a communicating entity of a networked system that exhibits aspects of a network service that determines the presence of known or unknown malware operating on at least two networked units by correlating observed similarities between clustered interaction data as an identifiable pattern. In order to perform the determination, the at least one detection and classification unit comprises some functional/logical components including physical memory, a processor, and a network access module. The physical memory is provided as the storage destination for the collected interaction data. The processor is the computational entity that is configured to interact with the plurality of networked units in order to collect interaction data, cluster said interaction data based on detectable markers, and identify patterns associated with malware based on observed similarities between the clustered interaction data. The network access module is the communications channel through which the detection and classification unit interacts with the plurality of networked units.

In various embodiments, the at least one detection and classification unit interacts with the plurality of networked units across a networked connection. The networked connection affords the detection and classification unit the ability to effectively function as a network service that collects information related to actions of an individual networked unit, interaction between individual networked units and the network, interaction between individual networked units and non-networked elements, interactions between individual networked units and the plurality of networked units, interactions between the plurality of networked units and the network, and interactions between the plurality of networked units and non-network elements. For example, the networked connection collects, classifies and identifies patterns based on the operation of anti-virus products running on individual networked units; crash data submitted by individual networked units to third party service providers; and DNS lookups and routing requests made by individual networked units to servers whose functionality includes reporting of anomalous requests to the networked connection. An example of an anomalous request is a request associated with an IP address that is known to be associated with undesirable behavior, such as a so-called command-and-control server, which is commonly used by malware owners to coordinate the behavior of corrupted units.

In various embodiments, the at least one detection and classification unit interacts with the plurality of networked units through a networked connection, a proxy, or a combination thereof. In these embodiments, the at least one detection and classification unit collects interaction data from the plurality of networked units through either the networked connection or through a proxy, wherein the proxy is an agent that negotiates the collection of interaction data by the detection and classification unit. The proxy can function as a network intermediary that collects interaction data from the plurality of networked units prior to transmitting the collected interaction data across a network connection to the detection and classification unit. An example of such a proxy is a server run by a carrier that detects and reports device identities of network units that generate connection requests associated with undesirable behavior, such as access to webpages, IP addresses or network resources that commonly are only accessed by corrupted units. Lists of such webpages, IP addresses and network resources are generated and used for other purposes, such as for example to create blacklists for browsers.

In some embodiments, the proxy would function as an indirect agent that collects interaction data through a non-networked communications channel and then transmits the collected interaction data to the detection and classification unit. An example of such a proxy would be a customer service representative. The customer service representative would receive interaction data form a user reporting an anomaly on their networked unit, at which point the customer service representative would report the event and submit it as indirect interaction data that is transmitted across networked channels.

In some embodiments, the proxy can be provided as an external processor that utilizes a network connection to the physical memory of the detection and classification unit in order to interpret, cluster, and correlate interaction data to identify patterns. As an external processor, the proxy could pool interaction data from several network systems in order to improve the confidence of an identified pattern. Additionally, having the proxy configured as an external processor could potentially allow complex calculations to be reallocated to the external processor in order to improve the speed at which a pattern can be identified. It should be noted that in additional embodiments, the proxy can perform complete or partial interactions normally associated with the detection and classification unit as long as the interactions do not interfere with an identification of a pattern.

In some embodiments, the proxy can also be implemented as a portion of a networked device, reporting only on information related to one networked client. For example, the proxy can be implemented as a hardware or firmware component associated with the modem processor of a networked device. Specific examples of such a processor include a modem processor or SIM card associated with a handset: neither of these are reachable by typical malware, and both are able to collect and report information associated with the operation of an application processor associated with the same handset. This type of proxy observes computational behavior associated with the physical device it belongs to, extracts select information and communicates this to the networked connection. Example types of information include data associated with the results of computational processes running on the application processor(s) of the associated unit; how many application processors were actively involved in the computation; how long the computation took; what processor clock speed was used for each such application processor during the computation; and whether any other type of processor was involved in the computation, along with statistics associated with such a processor.

The plurality of networked units are devices that can receive computer readable instructions, perform simple computations, and interact in some manner with at least one detection and classification unit. Each of the plurality of networked unit comprise physical memory, a processor, and a network access module. The physical memory is provided as a storage location for computer readable instructions. The processor is provided as the computational entity that performs computations and runs the computer readable instructions. The network access module is provided as a communication port for interacting with the system network and the at least one detection and classification unit. Examples of networked units that can be used in conjunction with the techniques described herein include desktop computers, notebook computers, netbooks, personal digital assistants, tablet computers, thin clients such as Chromebooks and Chromeboxes, video game consoles, video playback devices (e.g., televisions, DVD players, and portable video players), set-top boxes, car infotainment systems, medical devices, handsets, so-called smart dust, sensor network nodes, and virtually any other device that includes a processor and a memory, including what is commonly referred to as "the Internet of things." In cases where a networked unit does not have a direct connection with the networked connection, but where peer devices are used to propagate messages between the two entities. An example of this is a node in a sensor network, most of which only can communicate with other such nodes of the same sensor network, but some of which can communicate with a proxy or a networked connection. Here, one node can convey the data from one or more other nodes, thereby providing network connectivity to nodes that are not directly connected to the networked connection, nor to the Internet.

The interaction data that is collected by the at least one detection and classification unit contains information related to a particular networked unit that contains detectable markers and observable similarities. The detectable markers allow the interaction data received from the particular networked unit to be clustered with the interaction data of another particular networked unit, based both on the markers and on environmental information associated with the networked units associated with selected markers. The at least one detection and classification unit can then find observable similarities between the clustered interaction data in order to identify a pattern that can be associated with a known or unknown strain of malware. The detectable markers can be variables or sets of variables that contain values matching known values associated with malware, but can also be variables or sets of variables that are determined through a comparison to be different from expected variables stored known by the detection and classification unit. For example, the detectable marker could encode or be correlated to a value associated with what software is running on a networked unit; the operation or non-operation of a networked unit; what network resources are requested or accessed by a networked unit; the computational burden of a networked unit during some portion of time; and failures and crashes associated with undesirable configurations, undesirable or flawed applications, and high-risk uses of applications and devices.

The observable similarities contain environmental data that provides information regarding the specific conditions associated with each of the plurality of networked unit at the time the interaction data was sent. Examples of environmental data can include but are not limited to the time and date relative to the time zone of the networked unit as well as the system time, such as Unix-time, of the networked unit; approximate location of the networked unit as expressed by routing information, cell-tower information, or other location information, including reported GPS location, as well as a location determined by a base station; data associated with the networked unit and its user(s), such as the social network(s) associated with the user(s) of the device; recent activity associated with the device, such as information about communication to and from the device, including the sender(s), recipient(s), data contents, and other information, such as whether the contents were encrypted, whether it was email, SMS, voice; whether it had attachments; routing information; DNS requests; registration data provided by the user of the device; behavioral data associated with the user of the device and the device itself; and other usage data affected by software that it is desirable to detect and classify.

The detectable marker is a variable or set of variables that are interpreted by the detection and classification unit as being anomalous for the collected interaction data. In various embodiments, the interpretation of a variable or set of variables being anomalous would occur following a comparison that determines the value or values associated with said variable, are at least in part similar to known values indicative of anomalous activity. In some embodiments, the interpretation of the variable as anomalous would be the result of the values or values associated with the variable differing from expected values. It should be noted that the values associated with the variables or set of variables found in the interaction data can be scalar or non-scalar values. Anomalous values are not necessarily indicative of a malicious failure.

For example, while one strain of malware may cause corrupted units to fail to respond to a request, it is also possible for a unit to fail to respond to a request due to a network failure, a benevolent system failure associated with the unit, or a power failure associated with the unit. While anomalous values are not directly indicative of a failure that is desirable to detect, it is meaningful to use them as a signal.

For example, it may be irrelevant to know that a small number of units failed to respond to a request during a time period, while it is relevant to know that an unusually large number of units failed to respond. Moreover, if an unusual number of these units are co-located and have similar environmental descriptors, the observation is very relevant.

For example, it is meaningful if it turns out that most of the observed units are within a two-mile radius and almost all of them are Android phones with a six-month old version of the operating system, and all are units that are known to have a Twitter app installed. This is the type of pattern that would be identified by the system. The system then automatically generates a plausible description of the problem, which in this example case could be that there is a geographically propagating malware that affects six-month old Android handsets' that use the Twitter app. This, in turn, points to vulnerabilities associated with the radio (whether Wi-Fi or Bluetooth); with the particular OS version; and with the Twitter app. At the same time, the system may identify another type of corruption, whether in the same geographic region or not; whether associated with the same operating system or not; and whether associated with the same applications or not. By performing a clustering step on received markers and associated environmental data, the system partitions the markers and their associated environmental data, after which each cluster is analyzed as described in the example below, using well-known statistical methods applied to the information. The clustering phase also frequently removes what can be referred to as false positives, such as failures to respond based on benevolent and coincidental power failures.

In various embodiments, the detectable marker can be defined by a third party source. For example, the third party source could be a security database that compiles a list of behavioral profiles, signature profiles, command and control websites, IP addresses associated with attack patterns, and various anomalous activities that would be provided to the detection and classification unit as an updatable list of detectable markers to scan for in the collected interaction data.

In some embodiments, the detectable marker can be defined by an interaction between a third party source and a network proxy. For example, the third party source could be a user that observes an anomalous event on their networked unit. The user could report the anomalous event to a network prox. through the interaction of the user with the network proxy, the anomalous event would be defined as a detectable marker circumventing direct reporting of interaction data by the networked device. In this example, the network proxy can be any network agent such as a customer service representative of a service carrier.

Detectable markers can be obtained by observing isolated devices infected with a known type of malware. In principle, only one such device needs to be infected to generate a set of relevant markers, since it will be known what markers are associated with a clean device of the same type. It is also possible to use collections of devices for this purpose. Whether one or more devices are used for the collection of the markers, such markers are useful to identify new strains of the same type of malware, e.g., a new version that is generated by a malware author by recompiling the malware or slightly modify the order with which it accesses resources in order to evade detection of signature-based or behavioral anti-virus methods.

The detectable markers can also be defined by well-known statistical methods commonly used to identify clusters, such as a support vector machine. The detectable markers can also be defined by studying the common effects of and markers associated with known types of malware, contrasting these to the markers associated with desirable and properly operating software, firmware and hardware to limit the rates of false positives and false negatives.

The detectable marker can be defined by an interaction between the at least one detection and classification unit with a particular networked unit. The detection and classification unit would contain specific information associated with a particular networked unit. The detection and classification unit would send the particular networked unit a request for a value known to said detection and classification unit. Upon receiving the value from the particular networked unit, the detection and classification unit can compare the received value to the known value and determine based on a comparison if the particular networked device is corrupted.

Interaction data, from the plurality of networked units, is collected by the at least one detection and classification unit upon identification of a detectable marker. In some embodiments, interaction data is a streaming signal whose values are reported on a scheduled interval but are only collected and stored on the physical memory of the detection and classification unit upon detection of a marker. In such examples, the detectable marker can be interpreted as an event in the signal, such as a sudden change in reported values, a repetition of a pattern in the reported values, or prolonged absence of at least part of the values. It should be noted that for the identification of a marker in a signal based on sudden changes in the values, a baseline for the streaming signal would need to be established in order to compare and determine the significance of the change. This can be done by comparing signals for a majority of devices with a collection of devices selected based on a suspicion that they have higher corruption rates. In some of these embodiments, the interaction data is received upon the occurrence of an event and/or following the issuance of request made by the detection and classification unit. For example, the detection and classification unit issues a computational challenge following specific action conducted on the particular networked unit. The particular networked unit would receive the computational challenge and respond with a set of values that can be interpreted as interaction data. Upon receiving the interaction data, the detection and classification unit would determine the presence of a detectable marker by comparing the received values against expected values. If the received values in the interaction data differ from the expected values, the detection and classification unit would identify the mismatch as a detectable marker and collect the interaction data in its physical memory for clustering. It should be noted that in the previous examples the detection and classification unit could make further determinations by issuing an additional request to corroborate the values initially received. This additional step would be similar to requesting a checksum and would reduce false positives.

Interaction data collected by the at least one detection and classification unit clusters the interaction data of at least two networked units based on type of the detectable marker. Here, one type of interaction data is the absence of interaction. The interaction data from one or more particular networked units is clustered with the interaction data of another one or more particular networked units, based on similarities between their detectable markers. By clustering the collected interaction data, the detection and classification unit is able to optimize the collected interaction data in order to more accurately identify patterns associated with known or unknown strains of malware.

In various embodiments, the detectable marker consists of low dimensional data that contains at least two variables which can be interpreted as vectors in a coordinate space. In these embodiments, the at least two variables can correspond to values that are real numbers $\mathbb{R}$, whole numbers, and finite value sets. For example, detectable markers that consist of low dimensional data can comprise values associated with time, location coordinates, actions performed, calculated values, delays associated with actions, and any variable that can be represented by a real number. In these embodiments, the low dimensional data can be clustered through the use of density based clustering methods, distribution based clustering methods, connectivity based clustering methods, and heuristic based clustering approaches.

In some embodiments, the detectable markers can consist of Gaussian and non-Gaussian Data that provides a set of values or a function that when graphed show a change representing an anomalous event. In these embodiments, the collected interaction data of a particular networked unit comprises sets of reported interaction data containing at least one value or parameter that displays a change over an interval of time. The change over the interval of time provides a variation that can be interpreted as the anomalous event. An example of this data would be device specific information that describes a rate such as data transfer speeds and expected battery charge values. In these embodiments, the Gaussian and non-Gaussian data would be clustered through the use of an expectation maximization algorithm, linkage based clustering methods, distribution based clustering methods, or centroid means clustering methods, or any combination thereof.

In some embodiments, the detectable marker consists of high dimensional data that contains a large quantity of variables that are vectors that correspond with a few dozen to several thousand dimensions. In these embodiment the large quantity of variable would correspond to values that that are real numbers $\mathbb{R}$, whole numbers, and finite value sets, but can additionally include 'fuzzy' values that are best understood as approximations rather than exact representations. For example, detectable markers that consist of high dimensional data comprises values that are quantifiable values such as time, location coordinates, categorizable actions performed, and calculated values as well as subjective or approximate values such as uncategorizeable descriptive language for an anomalous event. In these embodiments, the high dimensional data would be clustered through the use of Centroid-based clustering methods that include initialization methods, k-means++, Fuzzy C-Means, Gaussian Mixture models, subspace clustering methods, as well as spherical clustering methods.

The clustered interaction data is further analyzed by the detection and classification unit in order to identify patterns associated with known or unknown malware based on observed similarities between the interaction data of at least two networked units. By further analyzing the clustered interaction data, the detection and classification unit is able to observe similarities between the interaction data belonging between at least two networked units. These observed similarities can be used to correlate environmental data with the detectable markers to identify a pattern of behavior that can be associated with a strain of malware. It should be noted that while methods used for clustering and pattern recognition share obvious overlap due to the nature of analyzing sets of data, that the initial separation data based on detectable markers, defined anomalous events, allows for a more accurate analysis of the clustered interaction data in order to identify known malware but provide the system with a means of detecting and classifying unknown malware. Furthermore it should be noted that by further analyzing clustered interaction data and the associated environmental data, that extrapolation can be made as to the propagation of the detected and classified malware.

In some embodiments, the observed similarities between the at least two networked units consists of low dimensional data that contains at least two variables interpreted as vector quantities on a coordinate space. In these embodiments, the at least two variables correspond to quantifiable values that are correspond to values that are all real numbers $\mathbb{R}$, whole numbers, and finite value sets. For example, the at least two variables would correspond to values associated with distance related to a node in either physical or virtual space, a categorizable set of values associated with device specific data such as device operating system, device firmware version, and network connection method, as well as any quantifiable values that can be correlated between two networked devices. The observed similarities between at least two networked devices are correlated by the detection and classification unit through pattern recognition methods that include supervised and unsupervised learning. Some supervised learning methods that can be used by these embodiments are classification algorithms such as neural networks, support vector machines, Linear discriminant analysis, quadratic discriminant analysis, and maximum entropy classifiers; ensemble learning algorithms, parsing algorithms, supervised regression algorithms such as Gaussian process regression; and linear regression. Some unsupervised learning methods that can be used by these embodiments are clustering algorithms such as categorical mixture models, deep learning methods, hierarchical clustering, k-means clustering, and kernel principal component analysis; multi-linear subspace leaning algorithms such as multi-linear principal component analysis; and unsupervised regression algorithms such as regression independent component analysis and principal component analysis.

In some embodiments, the observed similarities between the at least two networked units contains a large quantity of variables which are vectors that correspond with a few dozen to several thousand dimensions. In these embodiment the large quantity of variable would correspond to values that that are real numbers $\mathbb{R}$, whole numbers, and finite value sets, but can additionally include 'fuzzy' values that are best understood as approximations rather than exact representations. For example, the observed similarities would correspond to values associated with distance related to a node in either physical or virtual space, a categorizable set of values associated with device specific data such as device operating system, device firmware version, and network connection method, and quantifiable data that can be correlated between two networked devices, as well as subjective or approximate values that can include uncategorizable descriptive language related to an event or grouping of unspecified user interactions. The observed similarities between at least two networked devices are correlated by the detection and classification unit through pattern recognition methods that include supervised and unsupervised learning. Some supervised learning methods that can be used by these embodiments are classification algorithms such as neural networks, support vector machines, Linear discriminant analysis, quadratic discriminant analysis, and maximum entropy classifiers; ensemble learning algorithms, parsing algorithms, supervised regression algorithms such as Gaussian process regression; and linear regression. Some unsupervised learning methods that can be used by these embodiments are clustering algorithms such as categorical mixture models, deep learning methods, hierarchical clustering, k-means clustering, and kernel principal component analysis; multi-linear subspace leaning algorithms such as multi-linear principal component analysis; and unsupervised regression algorithms such as regression independent component analysis and principal component analysis.

Figure 5:
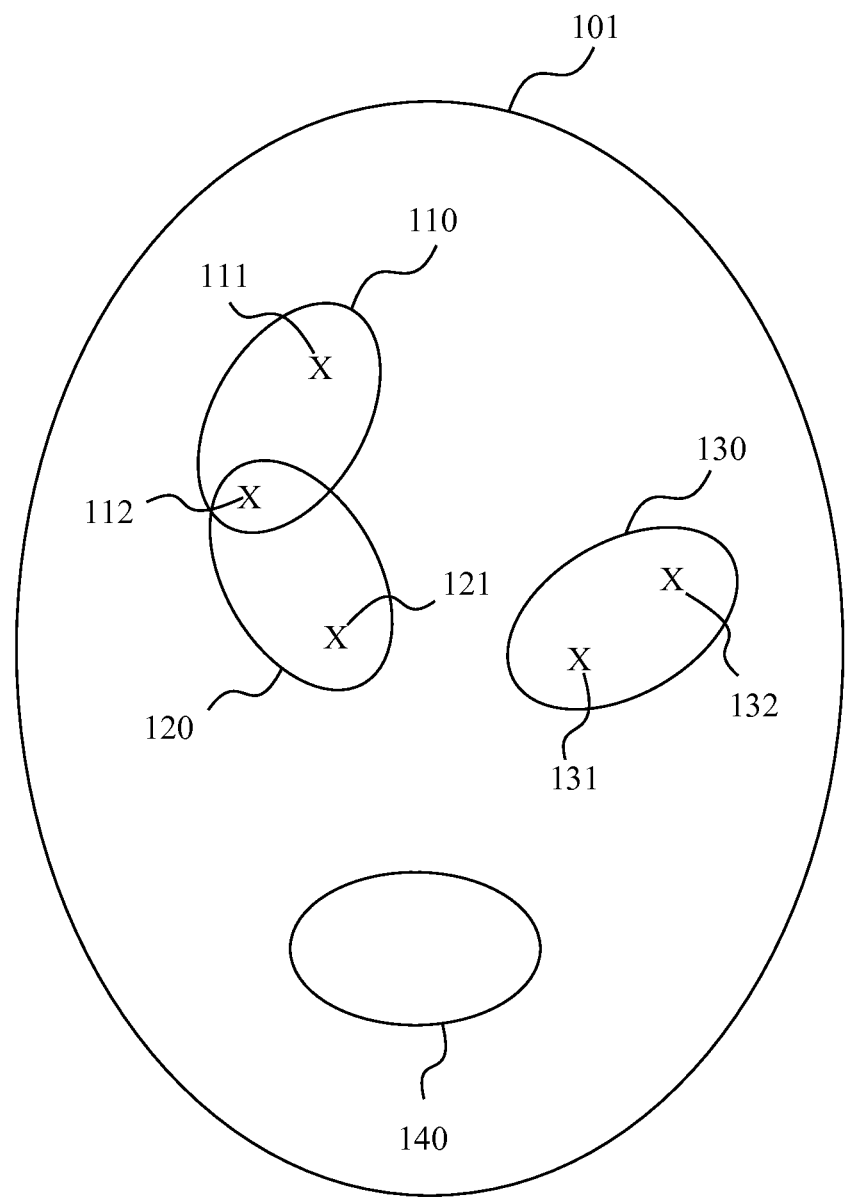
FIG. 5 illustrates an example of how different behaviors with respect to one test can distinguish malware instances.

FIG. 5 shows an example of how different behaviors with respect to one test can distinguish malware instances. As shown, there are a collection 101 of possible or known behaviors, and four different behaviors, 110, 120, 130 and 140. Malware instances 111 and 112 have behavior 110, and malware instances 112 and 121 have behavior 120. Malware instances 131 and 132 have behavior 130. There can also be further instances, some of which may not be known. A malware instance observed to have behavior 110 could be 111, 112 or an unknown instance, but cannot be 121, 131, or 132. Observing that this malware instance also has behavior 120 precludes that it is malware instance 111 alone. If malware 111 and 121 can co-exist, this is a possibility still. This leads to a conclusion that it is either malware instance 112, both 111 and 121, or a new malware instance that is not yet known. Observing that a malware instance has behavior 130 means that it is malware instance 131, 132 or an unknown malware instance, but that it cannot be malware 111, 112, or 121.

In the example shown, behavior 110 corresponds to the malware agreeing to be paged out by a detection routine. Behavior 120 corresponds to the malware only affecting Android phones with one specific version of the operating system. Behavior 130 corresponds to the malware attempting to block connections to the service that performs scans of networked units. Behavior 140 corresponds to a test vector (completion, timing success, value success, checksum, time, success)=(false, *, *, *, *, false), which is a combination of behaviors.

Figure 6:
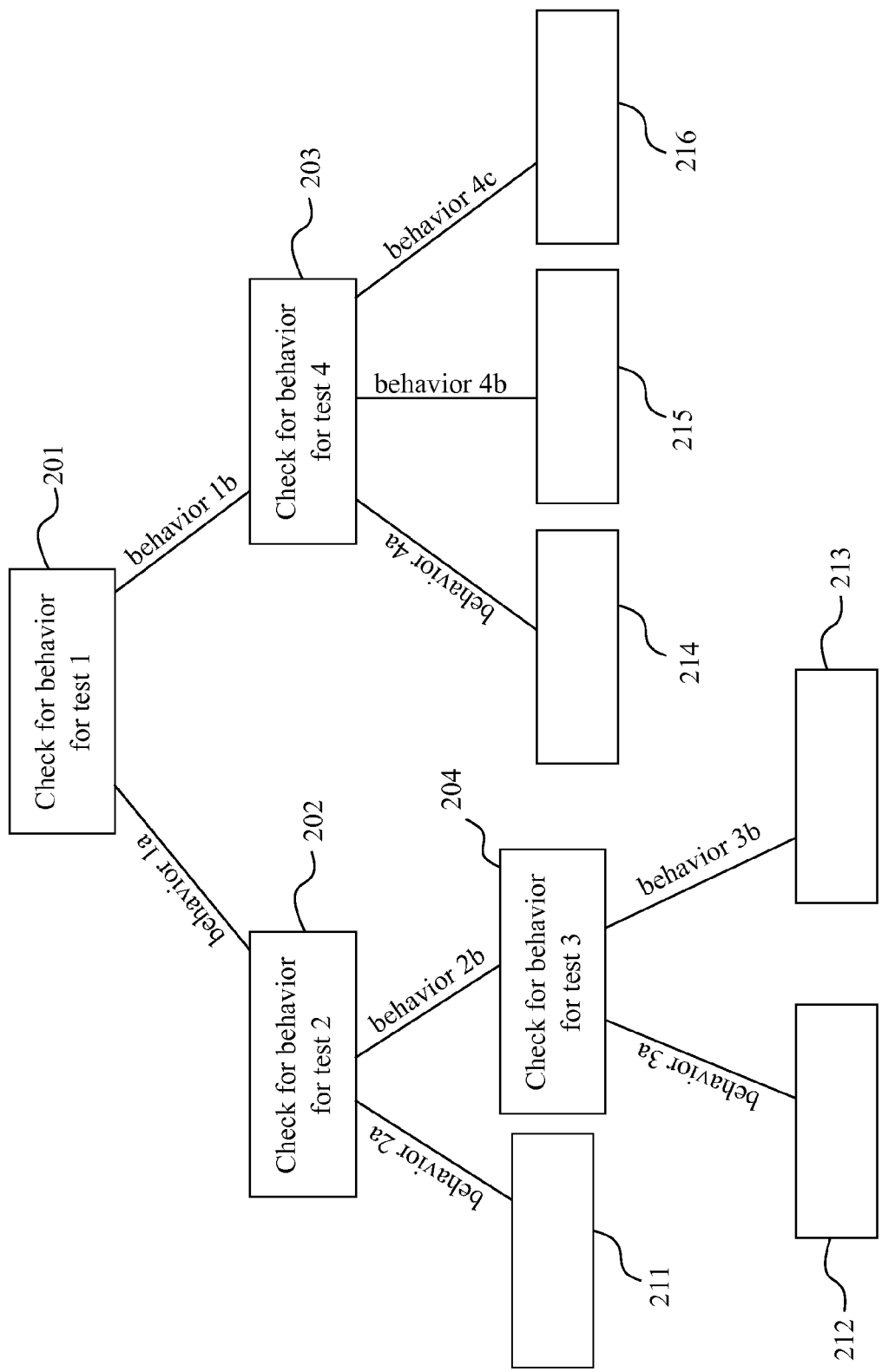
FIG. 6 illustrates an example decision graph used to determine what malware is present on a networked unit.

FIG. 6 shows an example decision graph used to determine what malware is present on an observed networked unit. A first test 201 is evaluated. If the result is behavior 1a, then a second test 202 is evaluated. If the result is behavior 2a, then this is indicative of conclusion 211, which is a collection of malware instances that have behaviors 1a and 2a.

The first test 201 can correspond to testing of behavior 140, where behavior 1a corresponds to not exhibiting behavior 140 and behavior 1b corresponds to exhibiting behavior 140. The fourth behavior test 203 corresponds to the believed operating system version of the observed networked unit, where behavior 4a corresponds to Android version 1.1, behavior 4b corresponds to Android version 1.2, and behavior 4c corresponds to iOS version 3.0.

The third test 204 can correspond to the propagation style, where behavior 3a corresponds to propagation to geographically nearby networked units, and behavior 3a corresponds to propagation to networked units that are not geographically nearby.

One example of an alternate approach to a collection of sequential test evaluations is to use unsupervised learning and clustering to identify likely malware instances based on known behavioral results. For example, this approach can be used for efficiency where a large number of tests are performed.

The detection and classification unit can utilize the behavioral pattern of the identified strain of malware to extrapolate propagation characteristics. The propagation characteristics describe or are associated with the means to which a strain of malware infects networked units. By understanding environmental data that relates to where and when the anomalous event took place as well as any useful interaction data of a particular networked unit, a propagation method for the identified malware strain can be determined. Some examples of propagation characteristics include:

1. A corruption that spreads slowly and geographically (i.e., new corruptions have similar geography as previous corruptions.) This is indicative of malware that spreads using Bluetooth or Wi-Fi. The "slow" is an indication that it requires some user action—in this case to move into a position where another user and her device are close.
2. A corruption that spreads very fast and to devices owned by people who are socially networked with (in one or a few number of steps) to users with devices that have been observed to be corrupted previously. The "very fast" is an indication that it does not involve a user action (movement, reading emails, clicking on links) and the "to . . . socially networked" is indicative that it uses an address book.
   If the fit is best for a phone address book, then it is likely that the corruption uses SMS.
   If the fit is best for an email address book, then it is likely that the corruption uses email.
   If the fit is best for a Skype address book, then it is likely that the corruption uses Skype.
3. A corruption that spreads rather but not very fast and to devices with the same software version. The speed is indicative of a user action, such as opening an attachment, clicking a link, etc. The "same software version" is indicative that the problem is only associated with this software and this version (where the software may be an operating system, an app, a driver associated with a particular OEM, etc.) In this case, one can conclude that the indicated software of the indicated version(s) have a problem associated with a user action.
   If in addition, there is an email address book related pattern, as above, then it is likely that the user action relates to receiving an email.

By extrapolating propagation characteristics, the detection and classification unit can determine what networked units are at high risk. Through the determination of high risk network units, the detection and classification unit can proactively require associated networked units to be screened in order to determine whether they are infected or not; proactively limits access to resources for such networked units; and alerts resource providers of the outbreak and its associated trends and characteristics.

In one embodiment, the detection and classification unit is configured to issue a computational challenge to the networked unit. One example of a computational challenge involves generating a collection of unpredictable numbers by the detection and classification unit, transmitting these to the networked unit, and having the networked unit use the numbers to generate a checksum to be delivered as part of the interaction data. In this example, the detection and classification unit requests interaction data from a particular networked unit by issuing the computational challenge.

In some embodiments, the checksum relates to code and data present or generated on the networked unit. The response to the challenge can take a variety of forms, including those involving the computed checksum, measures of how long the computation took, values that identify exceptions arising from the computation on the networked unit, and values that represent data and code present on the networked unit, or previously recorded as being present on the networked unit. In some embodiments, these values or portions thereof are corroborated and/or generated by entities that do not correspond to software elements on the networked unit. For example, the time the computation took can be corroborated, measured, estimated or generated by a hardware component associated with the networked unit, including a wireless node or network node not physically connected to the networked unit; and authentications of data generated by software on the networked unit.

The detection and classification unit receives and analyzes interaction data related to the issued challenge sent to the networked unit. Through the analysis of the received interaction data, the detection and classification unit is able to make a determination as to the presence of a detectable marker. A collection of different outcomes are possible:

1. One case is for the networked unit not to have any malware, resulting in satisfactory timing measures and satisfactory value results being obtained by the detection and classification unit as a result of the issuing of the computational challenge.
2. Another case is for the networked unit to have malware that does not interfere with the operating system and related routines, and which therefore is successfully disabled as a result of the issuance of the computational challenge. Typical Trojans behave in this manner. A subsequent scan of the contents of secondary storage allows a third-party server to record or detect such malware, which is not active. This malware is identifiable using traditional signature-based anti-virus methods, whether while still residing on the networked unit or after having been copied at least in part to a third-party server where traditional-type signature-based techniques can be used to identify it, and where traditional behavioral techniques can be used to identify it as it is being executed in a sandbox.
3. If the networked unit is infected, the malware may prevent the detection and classification unit from interacting with the networked unit. This may also be the result of network unavailability, battery failure or other hardware problems. The detection and classification unit will attempt to issue new computational challenges to the networked unit, not granting it access to an associated resource until the challenge is responded to in a satisfactory manner. The external detection and classification unit makes note of the failure to complete the computation associated with the challenge.
4. If the networked unit is infected, the malware may prevent the detection and classification unit from disabling at least one malware routine, which will remain active and which will cause an incorrect timing value. Incorrect timing values may also be the result of latency variance in systems where this is present; if there is a suspicion that this may be the situation, then the detection and classification unit may issue another computational challenge and determine whether this also results in an incorrect timing value. According to a policy used by the detection and classification unit, the networked unit may be prevented from gaining access to a resource associated with the challenge. If the timing is not satisfactory, then external detection and classification unit makes note of this.
5. If the networked unit is infected, the malware may result in an unsatisfactory value result being obtained by the detection and classification unit. This may also be the result of communication errors and hardware failure. The detection and classification unit may issue another computational challenge and determine whether this also results in an incorrect value result. According to a policy used by the detection and classification unit, the networked unit may be prevented from gaining access to a resource associated with the challenge. If the value result is not satisfactory, then the external detection and classification unit makes note of this, along with a value that is a function of the value result, and which may be thought of as a checksum of at least one or more malware routines that remained active throughout at least a part of the computation associated with the challenge.

The computation associated with the challenge therefore can be described by a tuple: (completion, timing success, value success, checksum, time, success).

Here, completion is a variable that indicates whether the interaction completed; timing success is a variable that indicates whether the timing is satisfactory; value success is a variable that indicates whether the value result is satisfactory; and checksum is a value that is a function of the value result and the challenge; time represents the time it took; and where success is a variable that indicates whether the timing and the value result both are satisfactory. These are example elements of such a tuple. In some embodiments, it is sufficient to observe the value of the variable success to determine whether a networked unit can be asserted to have no malware or not. The other variables are indicative of the type of malware.

A first type of malware may stop the protocol described above from completing. This will result in a (completion, timing success, value success, checksum, time, success)= (false, *, *, *, *, false), where * indicates that the value does not matter or does not apply.

A second type of malware may remain in memory and attempt to compute the expected value result, but fail to do so within the time boundaries. This may correspond to (completion, timing success, value success, checksum, time, success)=(true, false, true, *, time, false).

A third example type of malware, such as "com.space.sexypic-GGTRACK", may refuse to be inactivated, which may result in (completion, timing success, value success, checksum, time, success)=(true, *, false, checksum, *, false).

If the malware scan of a given networked unit results in (completion, timing success, value success, checksum, time, success)=(true, false, true, *, 3.4 s, false), the detection and classification unit would know that it is not a malware of the first example type, nor malware of the third example type. It may not know what particular strain of malware it is, but it would know that it is malware of the second type, and that the malware caused a delay of, say, 3.4 seconds. Different malware strains are likely to cause different such delays, and therefore, the detection and classification unit can narrow down what likely strain(s) it is observing. Similarly, in the case where the value result is incorrect, the value of checksum will identify the malware strain with a good probability, and will help exclude malware strains that result in other checksum values.

In addition to observing and recording tuples of the type described above, or of related nature, the detection and classification unit correlates the environmental data provided in the collected interaction data for the particular networked unit. Examples of environmental data that the detection and classification unit can record include:

a. The time(s) of the failed scan(s).
b. The location of the networked unit, as expressed by routing information, cell-tower information, or other location information.
c. Data associated with the networked unit and its user(s), such as the social network(s) associated with the user(s) of the networked unit.
d. Recent activity associated with the networked unit, such as information about communication to and from the networked unit, including the sender(s), recipient(s), data contents, and other information, such as whether the contents were encrypted, whether it was email, SMS, voice; whether it had attachments; routing information; etc.

Based on the classification of the networked unit, given the tuple (completion, timing success, value success, checksum, time, success), and based on patterns observed in terms of environmental data; and based on such information associated with other networked units; the detection and classification unit will be able to further narrow down what the malware does. For example, if a given strain of malware spreads using Bluetooth, then this will result in geographically co-located observations of infected networked units within a given period of time. Another may spread using the contacts of the user of the infected networked unit, which will result in limited degrees of co-location for the detections of infected networked units within a given period of time. Yet another, such as an Internet worm, may spread by selecting an IP address to jump to, and attempt to infect such a networked unit.

Therefore, observing the environmental data may help disambiguate between two or more known strains of malware that both have some characteristics described by the associated tuple (completion, timing success, value success, checksum, time, success). Namely, a given networked unit may result in (completion, timing success, value success, checksum, time, success)=(false, *, *, *, *, false), which means that the malware that infects it does not allow the computation to complete. Another collection of networked units in the same neighborhood may exhibit the very same (completion, timing success, value success, checksum, time, success)=(false, *, *, *, *, false). That is an indication that they all correspond to the same type of infection, and that this infection may spread using Bluetooth or Wi-Fi. On the other hand, if there is significant co-location among networked units that are observed to be infected and that are represented by a given tuple, then it is concluded that these networked units are not likely to be infected with malware that spreads using Bluetooth or Wi-Fi.

The above detection and classification does not require knowledge of the type of malware but a given pattern, where the pattern corresponds to a tuple and a collection of environmental data. It is possible to identify new strains of malware, and to distinguish them from other strains, whether these other strains are known or not.

Once it is established what category of malware a given instance corresponds to, the detection and classification unit determines what other networked units are at high risk, based on the inferred propagation behavior of the malware strain likely to be associated with the networked unit. Then, the detection and classification unit proactively requires associated networked units to be screened to determine whether they are infected or not; proactively limits access to resources for such networked units; and alerts resource providers of the outbreak and its associated trends and characteristics.

In some embodiments, the networked unit that is being tested has multiple cores, and at least one core performs a different task than the other cores. For example, one core can perform a calculation that is affected by any attempt to remap memory, but which is not guaranteed to cover all cells of relevance, whereas one or more other cores may perform a calculation that computes a checksum of a collection of all memory cells of relevance. The result from each core can be considered the result of a test.

In another embodiment, it is determined whether a piece of malware will agree to let an infected networked unit make a connection to the external detection and classification unit; whether it will allow its code to be read using a check summing phase; whether it pages out when told to do so; and/or whether it causes a delay when the scan is performed.

Misc:

A variety of devices can be used in conjunction with the techniques described herein. For example, in some embodiments device is a video game console. The video game console is configured to communicate with a verifier under the control of the manufacturer of the game console via the Internet. If the owner of device makes an unauthorized change to device (e.g., by using a modification chip), verifier will be able to detect the modification accordingly.

Other examples of devices that can be used in conjunction with the techniques described herein include desktop computers, notebook computers, netbooks, personal digital assistants, video playback devices (e.g. televisions, DVD players, portable video players settop boxes, medical devices, and virtually any other device that includes a processor and a memory.

In various embodiments, verifier is controlled by a user of device, instead of by a separate entity. For example, a desktop computer owned by the user of device can be configured to provide verification services to device. In that scenario, device can be configured to communicate with the verifier via a local network. Device can also be configured to communicate with verifier directly (e.g., via a dedicated cable) and network is omitted as applicable.

In some embodiments a verifier is collocated with or otherwise directly coupled to device. For example, a subscriber identity module ("SIM") card inserted into a cellular phone can be configured to provide the functionality of verifier to the cellular phone. As another example, the functionality of verifier can be integrated into a power cord used to charge a cellular phone. In such embodiments, an external verifier can either be omitted, or can be used in addition to the verification services provided by the collocated/coupled verifier. As one example, suppose device is a personal video player with integrated WiFi capabilities. A power cord used to charge the device can be configured to provide verification services to the device each time it is charged. In addition, if the WiFi radio is active, the device can be configured to communicate periodically with a verifier provided by the manufacturer of the device. As another example, a verifier can be included on a USB device that is periodically inserted by a user into a laptop. In addition, whenever a user of laptop attempts to conduct banking transactions with an online bank, the bank can also provide verification services to the laptop prior to granting access to the user's account. As yet another example, a network operator or service provider can require a user to have his or her machine audited before he or she is allowed on the network or allowed to access a service. User can also initiate an audit, for example, after realizing that he or she has been exposed to a potentially risky situation. One way a user can initiate an audit is to select a menu option on the device. Another example ay is for the user to request an audit from verifier (e.g., by submitting an online request through a web form).

An embodiment of a device. In the example shown, device includes a processor, a first memory, a second memory, and a communications interface. As one example, device includes a 528 Mhz ARM processor, 128 MB of RAM, a micro SD card slot into which a user has inserted a 1 GB micro SD card, and a 3G modem. Memory is also referred to herein as "fast" memory. Memory is also referred to herein as "slow" memory. However, memories and need not be different speeds. Other components may also be included in device, such as a UPS receiver (not shown). Elements, such as second memory, may also be omitted as applicable.

Using the auditing techniques described herein, the absence of active processes in fast memory can be verified. And, after that verification has been completed, all memory (e.g., both fast and slow) can be scanned to identify, classify, report and potentially modify the contents of the fast and slow memory, or portions thereof. The distinction between fast and slow memory can be made in a variety ways. For example, on a device with RAM, flash memory and a hard drive, it is possible to treat only the RAM as fast memory and flash memory and the hard drive as slow memory. It is also possible to treat both the RAM and the flash memories as fast memory and the hard drive as slow memory. It is also possible to consider all memory physically located on a given device as being fast, and all external memory accessible (or potentially accessible) by the device as slow. The turnaround time to communicate to external components will cause such external accesses to be slower, irrespective of the type and actual local access speed of the external memory. Depending of what types of memory are treated as fast vs. slow, the selection of parameters would be done accordingly.

As will be described in more detail below, the existence of unauthorized modifications to device can be detected by configuring device to run a series of modifications to Memory and examining the results. If for example, the time it takes to perform the modifications exceeds a tolerance of a predetermined length of time, or if a result determined in conjunction with the modifications does not match an expected result, the presence of an evasive program may be indicated. In various embodiments, the Memory modifications are performed across all memory on a device (e.g. both Memory and memory), instead of being run only on fast memory such as memory.

an embodiment of a process for performing a device audit. In various embodiments, the process is performed by device. The process can be initiated in a variety of ways. For example, the process can be initiated every time the user charges the device (e.g., by configuring the device to initiate the process when it detects a power supply). The process can also be initiated in response to the occurrence of a particularly large or unusual transaction, in response to a concern that the user is at risk (e.g., in response to the carrier receiving notification that a new vulnerability has been released by a nefarious individual), in response to the elapsing of a certain amount of time, etc. Additional examples of events that can trigger the initiation of the process include an attempt by the user of device to make a payment or otherwise engage in a financial transaction, an authentication attempt (e.g., the user of the device attempting to access to a bank account), and an access request being performed (e.g., a request for the download of a movie to the device).

The process begins at when one or more hardware parameters that correspond to a hardware configuration is received. Example hardware parameters include the amount and the speed of fast memory. For example, in the case of the device, the hardware parameters would include "amount=128 M" and "speed=300 Mhz."

The hardware parameters can be received in a variety of ways. As one example, the SIM of a cellular phone can be configured to detect the amount and speed of installed memory. As another example, if a proprietary cable is used to connect device to a power source (or to a computer or other device), the parameters may be known (and thus "received") by virtue of the cable only working in conjunction with a device having a specific amount and speed of memory. As yet another example, a serial number of a device may indicate the amount and speed of fast Memory installed on a device. In various embodiments, the user (or a representative thereof) is requested to input memory parameters in a web form or a configuration file. Assumptions can also be made about the likely memory configuration of the device and a benchmarking program can be run to confirm whether the assumption is likely to be correct.

a sequence of modifications to a physical memory is performed. Examples of ways in which such modifications can be performed are described in more detail below. In some embodiments the sequence of modifications to be performed is determined by the verifier. The set of modifications to be made can be provided to the device in a variety of ways. For example, the sequence can be pre-loaded onto the device at time of manufacture, at time of delivery to the supplier, or carrier, or at the time of purchase. It can also be loaded by user choice or by a service provider at any time after purchase (e.g., as an over-the-update or as a firmware update), or when needed to perform an audit. The parameterization can be performed by the manufacturer or supplier or carrier, given known specifications. It can also be performed through a lookup, e.g., of serial number, by a user or service provider. The parameters can be associated with the model or device name. If the device is reconfigured, e.g., by replacement or addition of components, then these new components can carry information about the new or additional parameterization. The components can also carry the entire set of instructions, instead of just the parameters. Alternatively, the serial numbers, names, or types of components can indicate the needed change in parameters. If it is believed that the client device is secure at the time of installation of the algorithm or a new component, then the client machine can also inquire what components are installed (as is typically done as a system is booted up), and set the parameters accordingly.

In various embodiments, device manufacturers offer to preload non-activated auditing software at no cost, and later request payment to activate auditing services (and/or the additional scanning services described in more detail below. The auditing software can subsequently be activated by carriers, on request by end users or service providers. The carrier collects payment for the activation and optionally forwards portions of the payment to the handset manufacturer, providers of auditing software, providers of additional scanning software (e.g., antivirus detection services), and any other parties involved in the transaction.

one or more results of the portion of the process performed at are reported to a verifier.

in some embodiments multiple iterations of modifications to the memory and communications with the verifier are made, and the processes shown in FIGS. 3 and 4 are adapted accordingly.

an embodiment of a process for performing a device audit. In various embodiments, the process is performed by verifier. As explained above, in some embodiments the process is performed by an entity separate from device (such as on a verifier controlled by a carrier). In other embodiments the process is performed by a verifier located on or otherwise physically coupled to device.

The process begins at when results are received. For example, when device reports results at, those results are received by a verifier at.

a determination is made as to whether the results received at indicate that an expected sequence of physical modifications was made. Verifier is configured with information such as the amount of time the execution of a sequence of memory modifications should take on device (assuming no authorized modifications have been made). In some embodiments verifier is also be configured to store additional information, such as seed values and the results of computations performed by device.

If the expected sequence of physical memory modifications is determined to have been made (e.g., device performed the sequence of memory modifications), it is concluded that no unauthorized modifications have been made to the device. And, any evasive processes that might previously have been active on device have been neutralized. If the expected sequence of physical memory modifications is determined to have not been made (e.g., because the amount of time to perform the sequence is off, or computed results are incorrect), it is concluded that an unauthorized modification has been made to the device. (e.g., that an evasive process is present on the device and is attempting to avoid detection).

a representation of a memory prior to an execution of the process. In the example shown, kernel, authorized program, unauthorized program (e.g., a malware agent), and an auditor program are loaded in RAM. Typically, in order to remain resident on a device, an evasive program needs to do one of two things. It must either remain active in RAM (or swap space), or it must modify a legitimate program, data, or configuration of the device to allow the malware agent to gain control after a scan has been performed. As will be explained in more detail below, using the techniques described herein, the presence of the malware agent can be detected, irrespective of the techniques it employs to evade detection. In addition, using the techniques described herein, the presence of the malware agent can be detected even if auditor is loaded after malware agent.

a representation of a memory while the process is occurring. As will be explained in more detail below, auditor is configured to clear memory RAM (and any swap space) except for the space used by auditor. In various embodiments, a minimalistic set of other services is also permitted to occupy RAM. For example, if device supports 3 G communications, the area of RAM occupied by a 3G driver/module is not cleared, so that auditor can use the 3G modem to communicate with verifier. As another example, in some embodiments a microkernel is permitted to occupy a portion of RAM while auditor clears the remainder of the RAM.

an embodiment of a process for auditing a device. The process begins at when an auditor process running on device such as device clears all portions of Memory (and any swap space) that is not claimed for use by the auditor. In some embodiments, this includes unloading the kernel, various drivers, and all other processes. In various embodiments, the unclaimed memory space is overwritten by a sequence instead of being cleared (e.g., with zeros). One example sequence is a pseudo-random sequence that is combined with the original memory contents, such as by using the XOR operation. This allows the unclaimed memory space to later be reconstituted by the repeated combination with a pseudo-random sequence that complements or equals the previously used pseudo-random sequence. The unclaimed memory space can also be overwritten with contents in a way that clears it, but which does not correspond to the typical erasing operation of the device. For example, it is possible to clear unclaimed memory by writing a sequence of 01010101 to it, or any other appropriate sequence.

In some embodiments, the auditor code comprises two components: a loader and a variable algorithm segment. The task of the loader is to load algorithm segments from non-RAM storage (e.g., something other than memory), and hand over control to the loaded algorithm segment. After an algorithm segment has completed, it hands back the control to the loader.

contents of Memory are reported to verifier. In some embodiments the entire contents are reported. In other embodiments, only descriptions of changes since the last audit are communicated.

the device receives a cryptographic seed from the verifier. The seed is expanded to a pseudorandom string and the string is written to RAM. An example technique for writing a string to RAM in accordance with portion of process is provided below.

the device receives a cryptographic key from the verifier.
the device uses the received key to compute a keyed hash of the entire contents of the device's RAM.
the device reports the resulting value to the verifier. Verifier evaluates the results, e.g., according to the process.

In various embodiments, device reports state information from computations at and at time intervals set by verifier. The use of such intervals provides assurance that the computations performed by device are being performed within Memory (and not, e.g. a portion of memory).

Device obtains updates, from verifier, of the seed and respective key on an as-needed basis. The use of updates provides assurance that device is not outsourcing computation to an external fast resource. For example, in order to outsource the computation, an evasive program would have to forward the seed and key updates to the external device, which would introduce a measurable delay.

Verifier verifies that both the final function value and partial results are correct and are reported by device to the verifier within acceptable time bounds. An example technique for evaluating the time it takes an auditor to perform its tasks is provided below. As mentioned above, in some embodiments verifier is external to device and is operated by a party other than the owner of the device. In other embodiments, verifier is under the control of the user of device.

After the process has been completed, auditor can restore the contents of the device, whether fully or partially, and return control to previously active processes or to a process performing further scans of memory contents. The contents of the fast memory can be restored if they were swapped out to slow memory prior to the execution of the timed computation, or if the original contents were combined with a string, the latter allowing a similar combination to be performed, thereby recovering the previous state. It is also possible to restart the device by loading a "starting" state. It is further possible to first hand over control to a process that scans, reviews, reports and modifies the contents of memory, or any subset of these operations (described in more detail below).

The reporting can be presented to verifier, or to a third party, such as one in charge of managing the processing of memory contents. In the latter case, verifier may be in charge of assuring that there is no active malicious process, and the second verifier could be in charge of processing the memory of the device to determine whether it complies with a particular policy, which may be related to malware detection, digital rights management, or another policy identifying what device memory contents are desirable.

Example Adversarial Strategies

In order for an evasive program to avoid being detected, e.g., during portion of the process, it must be active in RAM, either as a unique process or as part of a corrupted version of auditor. The following are four example ways in which an evasive program such as malware agent can attempt to remain active:

Strategy 1: Outsource Storage.

The malware agent can stay active in RAM and attempt to remain undetected by causing auditor to not clear the appropriate space (e.g., at) and rely on non-RAM storage or external storage to store the corresponding portion of the pseudo-random string generated at. The computation would then be modified to use the outsourced storage instead of the space where the malware agent resides.

Strategy 2: Compute Missing Data.

Instead of outsourcing storage of portions of the pseudo-random string, the malware agent can store a modified representation of the string (e.g., a compressed version, or a version that is missing portions), and reconstitute relevant portions of the string as they are needed during the computation of the keyed hash. Since the malware agent has the seed from which the pseudo-random string is generated, it can use this—or later states of the pseudo-random generator—to regenerate required portions of data.

Strategy 3: Outsource Computation.

The malware agent can forward relevant data to an external device (assuming the necessary communications infrastructure, such as a WiFi connection is still enabled). The external device receives data from device and computes the values needed to report to verifier, feeding these values to the malware agent on device.

Strategy 4: Modify Detection Code.

The malware agent can attempt to replace the code of auditor with modified code. This replacement code may be designed to suppress reports of compromised memory contents, or contain a hook for malware code to be loaded after the audit completes. The can attempt to incorporate such changes to auditor without taking up more space by swapping out or compressing portions of the auditor code and loading or unpacking it again as it is needed.

Filling Fast Memory

This section describes an example technique that can be used in conjunction with portion of the process.

an example of pseudo code for use in conjunction with auditing a device. In the example shown, the subroutine get_permutation returns a vector indicating a random permutation of number_blocks items, ranging from 0 to number_blocks−1, where number_blocks is the number of portions of size equal to a flash block that the RAM comprises, minus those needed by the auditor. The subroutine next_string_chunk returns a pseudo-randomly generated chunk of bits; the term chunk is used to refer to the amount of data that can be sent on the memory bus. As one example, for an Android G1 phone, a chunk is 32 bits.

Both get_permutation and next_string_chunk use the most recently provided seed as input. The pseudo-random string can be computed as $segment_i \leftarrow hash(segment_{i-1})$, i.e., in a way that cannot be computed using random access. One example is a function based on iterated application of the hash function, given the non-homomorphic properties of hash functions. A variety of hash functions may be used. One example is MD6 in 512-bit mode.

The constant rounds is the number of times a pseudo-random chunk is XORed into the contents of a cell, using the function modify_memory. The choice of rounds controls the amount of work an adversary has to perform to carry out the second adversarial strategy (computing missing data), while also incurring an increasing cost to the honest execution of the algorithm for large values. In the example shown, rounds=2, which results in a noticeably greater cost to the adversary than rounds=1, since the value of each cell will come to depend on two other cells. This can confound memory management strategies of an adversary. In the example shown, chunks_per_block is the number of chunks contained in a flash block, equaling 32768 (=128 kB/32 bits) for an example G1 phone, while number_blocks=1024 (128 MB/128 kB).

The function modify_memory(pos, string) XORs the contents of position pos with the value string, where pos=0 describes the first chunk of RAM to be operated on, and pos=number_blocks×chunks_per_block−1 is the last chunk.

The memory access structure described causes accesses to individual pages of randomly ordered blocks, if forced to use flash (e.g., memory) instead of RAM. This will cause the flash to be cleared with an overwhelming probability, and the pseudo-random access order prevents the adversary from scheduling the memory accesses to avoid this drawback. The cost of a flash-bound computation in comparison to the RAM-bound alternative available to the honest execution of the algorithm is noticeably more time consuming.

In some embodiments, one hash function application is used to generate several invocations of next_string_chunk. This reduces the computational burden associated with the auditing process, which emphasizes the contribution of the memory access in terms of the time to perform the task.

In various embodiments the input to the hash function is a constant number of previous outputs; this complicates storage for a malware agent wishing to reconstitute the state of a given portion of the pseudo-random generator, and is thus useful to further frustrate any attempt to use strategy 2 (compute missing data).

Performing Timing

This section describes an example technique that can be used for timing the execution of auditing tasks. For example, in some embodiments the technique is employed by verifier.

Verifier is configured to time the execution of portions and of the process, e.g., to identify attempts to outsource storage; compute missing data; and outsource computation.

In some embodiments verifier is configured to obtain state information from device at frequent intervals (e.g., that are set by verifier). One example of state information is the memory contents of the memory chunk that was last updated, which vouches for that device has reached this stage of the computation. Verifier sends update requests to device at regular intervals. In some embodiments the update requests correspond to updates of the state of the pseudo-random generator used to compute the output of the subroutine next_string_chunk. If the output of the subroutine next_string_chunk is generated by selecting an unused portion from an already generated pseudo-random string, the string can be cleared at the same time, thus forcing the new seed to affect the state immediately.

An evasive program employing adversarial strategy 3 (i.e., outsourcing computation), must transmit the update of the pseudo-random string to the external device that performs the computation, after which the external device has to compute the resulting next value to be reported by device to verifier and transmit this to the evasive program. This incurs a round-trip delay. If the round-trip delay exceeds the time between timing checkpoints, the cheating will be detected.

In various embodiments, the device-specific time between checkpoints is chosen so that there is not enough time to outsource computation using communications equipment (e.g., WiFi) included on device, pessimistically assuming congestion-free environments.

The execution time of modify_memory is determined by the parameter selections described above and what hash function to use to compute next_string_chunk. For example, the MD6 hash function can be configured to different output sizes, from 224 to 512 bits. As explained above, in some embodiments a 512-bit version is used. The time per invocation of modify_memory is noticeably less than the time between checkpoints determined above.

Examples of Detecting Various Evasive Programs

The following section provides examples of how evasive programs employing the various strategies described above can be detected using the techniques described herein.

Defending Against Adversarial Strategy 1—Outsource Storage.

Assume an empty SD card has been inserted into device. The corresponding write speed could reach up to 5 MB/s. The size of a block processed by modify_memory as described above is chosen, in this example, to be 128 kB. The time to write the data to the SD card would be 25 ms. In comparison, suppose RAM on device has a write speed of 100 MB/s. The corresponding write time would be 1.25 ms. The additional delay can be readily detected. And, if multiple accesses to the SD card are made between two checkpoints, the additional delay will be even more readily detected.

Defending Against Adversarial Strategy 2—Compute Missing Data.

As mentioned above, the pseudo-random string can be computed in a way that cannot be computed using random access. To compute the value of a certain output, the corresponding input needs to be computed from stored data. Since rounds >1, the data stored in RAM is not this needed state, but a combination of the states of the two or more rounds. The state needs to be explicitly stored (in RAM) by the malware agent, as part of its code space, and the needed state computed from this. This forces the malware agent to compute at least (and in fact, much more) than rounds×number_blocks× chunks_per_block hash operations during the execution of portion of the process, in addition to the computation it needs to perform to "legitimate" computation. For the selected parameter choices, that is more than 100 million hash operations. Given an approximate time of 10 μs for computing a hash function invocation, this is about 1000 s, which is approximately 3 orders of magnitude more than the expected and can be detected accordingly.

A sample proof corresponding to the defense against strategy 2 will now be provided. Assume that an evasive program resides in Memory and takes up at least portions of some c 32-bit chunks for itself and its variables. A pessimistic assumption can be made that all of this space can effectively be used to store variables, which is not possible, but which gives a lower bound on the amount of work that the malware has to perform to remain undetected. In reality, its effort is greater as not all c chunks can be used for storage, but some are needed to store its code.

For each one of the c hits to RAM chunks that do not contain the values needed to compute the function, the malware agent has to compute the expected contents. It is assumed in this example that the original contents—before the RAM-filling was performed—were zero. If this is not so, the effort of the malware agent would be greater, so making this assumption establishes a lower bound on the effort of the malware agent. To compute the expected updates to this cell that would have been performed by the RAM-filling algorithm, the malware agent needs to compute the values for all the rounds passes on the memory chunk in question. The values XORed in to memory come from a pseudo-random sequence. And, it is only possible to reconstitute the state of the chain in the cell where it is missing by computing the value next_string_chunk from a value that is stored by the malware agent in part of the c chunks of storage. It is assumed that the variables are stored solely in RAM, or the malware agent needs to also succeed with strategy 1 (outsource storage).

As explained above, the pseudo-random generator cannot be computed using a random-access approach. It is the case that L=16 chunks is needed to store a state, given a chunk size of 32 bits and a state size (=MD6 output size) of 512 bits. The malware agent has to recompute the sequence of hash function invocations from a position of RAM associated with this state (which does not have to be where the malware agent stored this state.)

Given the random permutation over cells during the writing of the memory (the order which cannot be anticipated by the malware agent), the expected length of the run to the string position corresponding to the stored state is at least rounds× n/(c/L), where n=number_blocks×chunks_per_block corresponds to the number of chunks that RAM consist of, rounds×n is the length of the pseudo-random string, and where c/L are the number of pseudo-random states stored by the malware agent. Thus, for each hit to a "bad" cell, the malware agent has to perform an expected rounds×n×L/c invocations of next_string_chunk, which corresponds to rounds×n×/c. There are c such hits, not counting hits to "bad" cells that occur as the malware agent attempts to compute one of the expected states. Therefore, the malware agent has to perform at least rounds×n hash operations to compute the contents of the c bad blocks from the stored contents. The approximate time to do this (according to an example implementation) is at least between 100,000-1,000,000 times slower than the legitimate client which indicates that any attempt to compute missing data will be detected.

If the computation of the chain causes the access to a cell that has been used to store a value for another pass of the computation, then this causes another hit to be incurred. It would happen with an approximate probability (c−c/rounds)/ c×c/number_blocks=(c−c/number_blocks)/ number_blocks≈c/number_blocks for each memory access, and therefore, with approximate probability $1-(1-c/\text{number\_blocks})^{\text{number\_blocks} \cdot \text{rounds } 2/c}$ for a given first bad cell hit, as described above. A rough approximation of this quantity is $1-e^{-\text{rounds } 2}$. For rounds=2, this is more than 98% probability. This additional cost would increase with increasing values of c. An adversary would therefore do best to make c small.

In the following, assume that the adversary uses c=L=16 cells only, all 16 to store one value. With this configuration, the adversary would fail to compute the value (unless using external memory) in those situations where the chain leads in a direction that does not make it possible to compute the value corresponding to the "programcell" from the value in the "storage cell". For rounds=2, this failure occurs with probability 75%. In the remaining 25% of the cases, the adversary would simply be slowed down. (To always succeed to compute the value, the adversary needs to store at least round=2 values, each 512 bits long.

Defending Against Adversarial Strategy 3—Outsource Computation.

In some embodiments the time between checkpoints is chosen so that there is no time to outsource computation using the communications equipment on the device. The time between checkpoints can be chosen by verifier in a way that makes this immediately detectable. A strategy involving outsourcing of computation will fail, as the roundtrip has to be completed between two checkpoints for the right value to be provided by the adversary. This is independent of the speed of communication between the client device and the verifying party.

Defending Against Adversarial Strategy 4—Modify Detection Code.

Suppose unauthorized program corrupts the execution of some steps then willingly loads legitimate code and removes itself. Such an adversary could potentially corrupt portions and of the process, but will not be able to corrupt portion. Specifically, it needs to corrupt portion of the process (clearing swap space and RAM) in order to maintain active. It can then cause a misreporting of state at. However, this will be detected when the keyed hash of the memory contents are computed. This is both due to the assumed collision-freeness of the hash function used, and the fact that the key is not disclosed to the device until. Portion cannot be corrupted without being active during, which in turn would cause detection, as described above. And, the evasive program will be unable to compute the correct values to be reported at without executing portion of the process.

Combinations of the four adversarial strategies will also fail, since each of them will be detected and combinations of them do not change the underlying device-specific limitations.

Additional Processing an example of a process for performing a device audit. In various embodiments, the auditing processes described above form one phase of a two (or more) phase process. Once the techniques described above have been employed with respect to a device such as device, an assumption can be made that no evasive software is active in the RAM of the device. Arbitrary additional processing can then be performed on the device. Examples of additional processing that can be performed are described below.

Example Malware

After the processing of is performed, at, device performs traditional antivirus software to identify known bad software, such as may be stored in memory. At device can also be configured to report the entire contents of Memory or portions of memory to verifier or to another device.

Example Jailbreaking

After the processing of is performed, at device determines whether its operating system loader has a particular hash, and/or otherwise determines whether the operating system loader has been altered away from a desirable state.

Example Phone Unlocking

After the processing of is performed, at device determines whether its operating system loader has been altered and also determines whether any information associated with a service provider has been altered.

Example Software Piracy

After the processing of is performed, at device determines whether any software included in Memory has been modified from an expected configuration, ascertains any associated serial numbers for the software, and/or otherwise determines whether the included software is being used in an unauthorized/unlicensed manner. In some embodiments device reports the contents of Memory or portions thereof to verifier.

Example Media Piracy

Suppose that media files (e.g., music, video, or image files) are customized using watermarks during distribution, and that these watermarks are cryptographically authenticated, e.g., using a MAC or digital signature. At it can be determined which files present on device have legitimate watermarks, and whether these contain valid authenticators. The determination can be made either locally to device or centrally (e.g., on verifier).

In various embodiments, applications (such as a music player installed on device) record usage and other data (forming a log of activity) and associate the information with the appropriate media (e.g., song file). The logs can be read by the verifier at.

Example Chains of Custody/Usage Logs

Suppose an application (or data file) has an associated log file that is used to record transactions. One example is a log file that records the occurrence of financial transactions, including stored-value information. The legitimacy of changes made to the log file can be verified as follows. First, the processing of is performed. Then, at a determination can made (e.g., by comparing hashes of program images) as to whether or not the application (or data file) has been altered, and thus, whether the log file is genuine.

One approach to the processing performed at in this example is as follows: First, Memory is scanned and a list of applications and data files associated with the applications is created. Next, a list of descriptors for the applications and data files is determined. An example of a descriptor is a hash of the file, along with the name and type of file, and an identifier stating what string sequence(s) it matched. Next, a second list of any descriptions of applications or data that is not already reported on in the first list is made. The description created here may include all or parts of the code for an application, or of a description of what type of input files it processes and output files it produces. The second list is transmitted to an external party, such as verifier, where it is verified. The second list can also be processed locally using any policy obtained from a policy verification server.

The outcome of the verification can be used to affect the permissions to the applications and data, and can be used to control how external servers interact with the device, including whether it is granted access to network resources (such as the Internet, 3G networks, corporate networks, etc.). As another example, the software allowed to run on the device can be restricted, and notify the user of lack of compliance, attempt to remove or repair or otherwise modify files, etc.

Example Parental Control Filters and Other Monitoring Features

After the processing of is performed, in various embodiments, additional middleware is installed that can be configured to log (and/or block) various events associated with the device. Examples include:

(a) determining what photos was generated on the device and later transmitted out? (e.g., to prevent "sexting").

(b) determining (e.g., based on device activity and GPS changes) whether the device was used (e.g., for texting or watching video clips) while travelling at a speed greater than 20 miles per hour.

(c) determining (e.g., based on installation activity) whether alternative applications (such as a second instant messaging program in addition to a default program) has been installed, and then creating a log file for the alternative application.

(d) determining (e.g., based on browser history information) what URLs a user has visited including which URLs were manually navigated to and which URLs were referred to in other HTML documents that were accessed. One benefit of this logging is to identify whether a person is likely to have fallen victim to phishing; has visited a web site known to distribute unwanted content, including malware; and whether the device is likely to be involved in click-fraud. Such abuse is possible to achieve without infection of the device itself, e.g., by use of JavaScript, cascading style sheets, and/or other related scripting languages.

Preserving Privacy

In some embodiments descriptions of all state (e.g., the contents of memory) is communicated to the verifier. However, some data should preferably not be transferred off device, such as private keys and non-executable private data. In the following section, techniques preserving the privacy of such data are described.

Assume that a first random number is called x, and that it is selected from some space of possible values, 1 . . . max-x. It is possible that x encodes malware apart from providing an input to the auditing process for which it was intended. A legitimate program computes a one-way function value y from the input data x and some system parameters, which is called $(g_1, n_1)$. One example way of doing this is by computing $y = g_1^x$ modulo $n_1$, where $g_1$ generates a large subgroup of $G_{\{n1\}}$.

Let the program then compute a second one-way function value z from the value y and some system parameters, which is called $(g_2, n_2)$. One example way of doing this is by computing $z = g_2^y$ modulo n2, where $g_2$ generates a large subgroup of $G_{\{n2\}}$.

Next, it is assumed that the client machine proves (e.g., using a zero-knowledge proof) that there is a value x such that $z = g_2^{g_1^x \ modulo \ n_1}$ modulo n2, where $(z, g_1, g_2, n_1, n_2)$ are known by the verifier, but (z,x) are not. The device (the "prover") then erases the value x but stores (y,z) and the parameters $(g_1, g_2, n_1, n_2)$.

At later times, the device has to prove that the value y that it stores, but which is secret, corresponds to the value z. (Here, z may be stored on device, but can also be stored by verifier.) One example proof that can be used is a zero-knowledge proof.

If the second proof concludes and verifier accepts it, then the verifier knows that the unknown value z that the client stores is of a format that cannot be used to hide a significant amount of data of value to a malware agent.

Here, z may be used to encrypt some other data, which is referred to as m, and whose ciphertext is referred to as c. Thus, $c = E_z(m)$ for an encryption algorithm E. Assuming symmetric encryption, $m = D_z(c)$ for some decryption algorithm D. The device contents can be verified, but m remains unknown by the party receiving c. This party would not know z, but only that z is of some acceptable form that cannot hide large amounts of malware data. Since the auditing process described herein allows the verifier party to be assured that only legitimate programs exist in the RAM of the client device, it can be known that the programs—using the secret value z—can access in, given c. However, the verifier cannot.

Since it is known that the accessing program is legitimate, it is also known that in will only be accessed in an approved manner. For example, if m is data and not code, then it is the case that the accessing program will not try to execute the data.

Although the foregoing embodiments have been described in some detail for purposes of clarity of understanding, the invention is not limited to the details provided. There are many alternative ways of implementing the invention. The disclosed embodiments are illustrative and not restrictive.

Although the invention has been explained in relation to its preferred embodiment, it is to be understood that many other possible modifications and variations can be made without departing from the spirit and scope of the invention as hereinafter claimed.

What is claimed is:

1. A network device comprising:
   a physical memory;
   a network access module; and
   a processor device coupled to the physical memory and the network access module, the processor device configured to:
   collect interaction data from a plurality of networked units;
   cluster collected interaction data from different networked units of the plurality of networked units using a clustering method selected based on detectable markers within the interaction data includes determining a number of dimensions corresponding to detectable marker data and selecting a clustering method from a plurality of clustering methods based on the number of dimensions;
   identify pattern(s) associated with a strain of malware based on observed similarities in the clustered interaction data belonging to at least two networked units of the plurality of networked units;
   extrapolate a plurality of characteristics of the strain of malware to identify propagation characteristics of the strain of malware and identify at least one other networked unit that is at risk of being infected by the strain of malware; and
   initiate a proactive response action based on the propagation characteristics of the strain of malware to reduce propagation of the strain of malware, the proactive response action applied to the at least one other networked unit.

2. The network device of claim 1 wherein the detectable markers are associated with at least one anomalous event.

3. The network device of claim 1 wherein the clustering of the collected interaction data is accomplished by the processor device of the at least one detection and classification unit.

4. The network device of claim 1 wherein the observed similarities contain environmental data specific to a particular networked unit.

5. The network device of claim 1 wherein the at least one detection and classification unit communicates with the plurality of networked units through the network access module.

6. The network device of claim 5 wherein the at least one detection and classification unit communicates with the plurality of networked units through a proxy.

7. The network device of claim 1 wherein the patterns for the plurality of networked units are associated with at least one of an environmental feature of at least one of the units and/or a behavioral feature of at least one of the units.

8. The network device of claim 7 wherein an environmental feature comprises at least one of:
   a physical location associated with at least one of the units;
   a classification of the hardware of at least one of the units;
   a classification of the software of at least one of the units; and/or
   usage information associated with at least one of the units.

9. The network device of claim 7 wherein a behavioral feature comprises at least one of:
   a value computed by an associated device;
   a representation of the time it took to compute the value;
   the time at which the value was received; and/or
   a value representing an invalid response generated by the associated device.

10. The network device of claim 1, wherein the proactive response action applied to the at least one other networked unit includes at least one of: a network isolation of the at least one other networked unit until the plurality of networked units have been verified to be secure; a malware scan of the at least one other networked unit; and/or a limiting of transaction capabilities until a security task has been completed for the at least one other networked unit.

11. The network device of claim 1, wherein clustering the collected interaction data from the different networked units of the plurality of networked units using a clustering method selected based on detectable markers within the interaction data includes determining a number of dimensions corresponding to detectable marker data and selecting a clustering method based on the number of dimensions.

12. The network device of claim 1, wherein extrapolating the plurality of characteristics of the strain of malware to identify propagation characteristics of the strain of malware includes distinguishing between an infection that spreads via user action and an infection that spreads without user action and wherein identifying the at least one other networked unit that is at risk of being infected by the strain of malware is performed, at least in part, based on whether the infection spreads via user action or without user action.

13. The network device of claim 1, wherein clustering the collected interaction data from the different networked units of the plurality of networked units using a clustering method selected based on detectable markers within the interaction data includes detecting low dimensional detectable marker data and selectively clustering the low dimensional detectable marker data using one or more of density based clustering, distribution based clustering, connectivity based clustering, and heuristic based clustering.

14. The network device of claim 1, wherein clustering the collected interaction data from the different networked units of the plurality of networked units using a clustering method selected based on detectable markers within the interaction data includes detecting high dimensional detectable marker data and selectively clustering the high dimensional detectable marker data using one or more of Centroid-based clustering, k-means clustering, Fuzzy C-Means clustering, Gaussian Mixture model clustering, subspace clustering, and spherical clustering.

15. The network device of claim 1, wherein the pattern(s) are associated with information relating to a service provider providing network access to at least one of the two networked units.

16. The network device of claim 1, wherein the pattern(s) are associated with information relating to a social network accessed by at least one of the two networked units.

17. A method performed by a network device, the method comprising:
collecting, via a network access module in the network device, module data from a plurality of networked units;
clustering the collected interaction data from different networked units of the plurality of networked units using a clustering method selected based on detectable markers within the interaction data includes determining a number of dimensions corresponding to detectable marker data and selecting a clustering method from a plurality of clustering methods based on the number of dimensions;
identifying pattern(s) associated with a strain of malware based on observed similarities between clustered interaction data belonging to at least two networked units of the plurality of networked units;
extrapolating a plurality of characteristics of the strain of malware to identify propagation characteristics of the strain of malware and identify at least one other networked unit that is at risk of being infected by the strain of malware; and
initiating a proactive response action based on the propagation characteristics of the strain of malware to reduce propagation of the strain of malware, the proactive response action applied to the at least one other networked unit.

18. The method of claim 17, wherein the detectable markers are associated with at least one anomalous event.

19. The method of claim 18, wherein the detectable markers comprise: variables or sets of variables that contain values matching known values associated with malware, and/or variables or sets of variables that are determined through a comparison to be different or anomalous from expected variables stored and known by the at least one detection and classification unit.

20. The method of claim 17, wherein identifying pattern(s) associated with the identified strain of malware comprises:
scanning the clustered interaction data for observed similarities; and
identifying a pattern associated with the identified strain of malware on the at least two networked units.

21. The method of claim 17, wherein the plurality of characteristics of the identified strain of malware comprises infection characteristics, operation characteristics and propagation characteristics.

22. The method of claim 17, further comprising:
identifying infection and propagation behaviors and trends to determine the risk for the at least one other networked unit; and
identifying hardware and software products within the at least one other networked unit which have vulnerabilities that are associated with the strain of malware.

23. The method of claim 17, wherein the at least one detection and classification unit interacts with the plurality of networked units across a networked connection, a proxy, or a combination thereof, the proxy comprising a server, a customer service representative, an external processor, and/or a portion of a networked device.

24. The method of claim 17, wherein the observed similarities comprise environmental data that provides information regarding the specific conditions associated with each of the plurality of networked units at the time the interaction data was sent from the plurality of networked units.

25. The method of claim 17, wherein the proactive response action applied to the at least one other networked unit includes at least one of: a network isolation of the at least one other networked unit until the plurality of networked units have been verified to be secure; a malware scan of the at least one other networked unit; and/or a limiting of transaction capabilities until a security task has been completed for the at least one other networked unit.

26. The method of claim 17, wherein clustering the collected interaction data from the different networked units of the plurality of networked units using a clustering method selected based on detectable markers within the interaction data includes determining a number of dimensions corresponding to detectable marker data and selecting a clustering method based on the number of dimensions.

27. The method of claim 17, wherein clustering the collected interaction data from the different networked units of the plurality of networked units using a clustering method selected based on detectable markers within the interaction data includes detecting low dimensional detectable marker data and selectively clustering the low dimensional detectable marker data using one or more of density based clustering, distribution based clustering, connectivity based clustering, and heuristic based clustering.

28. The method of claim 17, wherein clustering the collected interaction data from the different networked units of the plurality of networked units using a clustering method selected based on detectable markers within the interaction data includes detecting high dimensional detectable marker data and selectively clustering the high dimensional detectable marker data using one or more of Centroid-based clustering, k-means clustering, Fuzzy C-Means clustering, Gaussian Mixture model clustering, subspace clustering, and spherical clustering.

29. The method of claim 17, wherein extrapolating the plurality of characteristics of the strain of malware to identify propagation characteristics of the strain of malware includes distinguishing between an infection that spreads via user action and an infection that spreads without user action and wherein identifying the at least one other networked unit that is at risk of being infected by the strain of malware is performed, at least in part, based on whether the infection spreads via user action or without user action.

30. The method of claim 17, wherein the pattern(s) are associated with information relating to a service provider providing network access to at least one of the two networked units.

31. The method of claim 17, wherein the pattern(s) are associated with information relating to a social network accessed by at least one of the two networked units.

32. A network device comprising:
  means for collecting interaction data from a plurality of networked units;
  means for clustering the collected interaction data from different networked units of the plurality of networked units using a clustering method selected based on detectable markers within the interaction data includes determining a number of dimensions corresponding to detectable marker data and selecting a clustering method from a plurality of clustering methods based on the number of dimensions;
  means for identifying pattern(s) associated with a strain of malware based on observed similarities between clustered interaction data belonging to at least two networked units of the plurality of networked units;
  means for extrapolating a plurality of characteristics of the strain of malware to identify propagation characteristics of the strain of malware and identify at least one other networked unit that is at risk of being infected by the strain of malware; and
  means for initiating a proactive response action to reduce propagation of the strain of malware, the response action applied to the at least one other networked unit.

33. The network device of claim 32, wherein the detectable markers are associated with at least one anomalous event.

34. The network device of claim 32, wherein the means for collecting interaction data comprises:
  means for storing the collected interaction data from the plurality of networked units; and
  means for communicating between the network device and the plurality of networked units.

35. The network device of claim 32, further including:
  means for identifying infection and propagation behaviors and trends to determine the risk for the at least one other networked unit; and
  means for identifying hardware and software products within the at least one other networked unit which have vulnerabilities that are associated with the strain of malware.

36. The network device of claim 32, wherein the plurality of characteristics of the identified strain of malware comprises infection characteristics, operation characteristics and propagation characteristics.

37. The network device of claim 32, wherein the means for initiating a proactive response action applied to the at least one other networked unit includes at least one of: means for isolating the at least one other networked unit until the plurality of networked units have been verified to be secure; means for performing a malware scan of the at least one other networked unit; and/or means for limiting of transaction capabilities until a security task has been completed for the at least one other networked unit.

38. A non-transitory machine-readable medium comprising instructions operational in a network device comprising a processor device, which when executed by the processor device, causes the processor device to:
  collect interaction data from a plurality of networked units;
  cluster the collected interaction data from different networked units of the plurality of networked units using clustering method selected based on detectable markers within the interaction data includes determining a number of dimensions corresponding to detectable marker data and selecting a clustering method from a plurality of clustering methods based on the number of dimensions;
  identify pattern(s) associated with a strain of malware based on observed similarities between clustered interaction data belonging to at least two networked units;
  extrapolate a plurality of characteristics of the strain of malware to identify propagation characteristics of the strain of malware and identify at least one other networked unit that is at risk of being infected by the strain of malware; and
  initiate a proactive response action to reduce propagation of the strain of malware, the response action applied to the at least one other networked unit.

39. The non-transitory machine-readable medium of claim 38, wherein the detectable markers are associated with at least one anomalous event.

40. The non-transitory computer-readable medium of claim 38, wherein the processor device executing the instruction to identify pattern(s) associated with the identified strain of malware receives further instructions causing the processor device to:
  scan the clustered interaction data for observed similarities; and
  identify a pattern associated with the identified strain of malware on the at least two networked units.

41. The non-transitory machine-readable medium of claim 38, wherein the instructions for initiating a proactive response action applied to the at least one other networked unit includes instructions for performing at least one of: a network isolation of the at least one other networked unit until the plurality of networked units have been verified to be secure; a malware scan of the at least one other networked unit; and/or a limiting of transaction capabilities until a security task has been completed for the at least one other networked unit.

* * * * *